(12) United States Patent
Ban et al.

(10) Patent No.: US 7,853,359 B2
(45) Date of Patent: Dec. 14, 2010

(54) CALIBRATION DEVICE AND METHOD FOR ROBOT MECHANISM

(75) Inventors: Kazunori Ban, Yamanashi (JP); Katsutoshi Takizawa, Yamanashi (JP); Gang Shen, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 498 days.

(21) Appl. No.: 12/068,113

(22) Filed: Feb. 1, 2008

(65) Prior Publication Data
US 2008/0188983 A1     Aug. 7, 2008

(30) Foreign Application Priority Data
Feb. 5, 2007     (JP)     ............... 2007-025323

(51) Int. Cl.
G06F 17/00     (2006.01)
G05B 19/02     (2006.01)
(52) U.S. Cl. ................. 700/263; 700/262; 700/246; 700/19; 318/568.11; 318/568.19
(58) Field of Classification Search ............... 700/252, 700/262, 263; 901/14; 318/568.15, 568.19
See application file for complete search history.

(56) References Cited

U.S. PATENT DOCUMENTS

| 7,447,615 | B2  | 11/2008 | Watanabe et al. | |
| 7,490,019 | B2* | 2/2009  | Fukumoto et al. | 702/150 |
| 7,532,949 | B2* | 5/2009  | Ban et al. | 700/245 |
| 2002/0087233 | A1* | 7/2002  | Raab | 700/262 |
| 2005/0096892 | A1  | 5/2005  | Watanabe et al. | |
| 2005/0159842 | A1  | 7/2005  | Ban et al. | |
| 2005/0225278 | A1* | 10/2005 | Ban et al. | 318/568.11 |
| 2005/0273199 | A1* | 12/2005 | Ban et al. | 700/248 |
| 2006/0025890 | A1  | 2/2006  | Nagatsuka et al. | |
| 2008/0004750 | A1* | 1/2008  | Ban et al. | 700/245 |

(Continued)

FOREIGN PATENT DOCUMENTS

EP     0 945 227     9/1999

(Continued)

OTHER PUBLICATIONS

Gang Shen et al., "Kinematic Calibration of In-Parallel Actuated Mechanisms Using Fourier Series," Transactions of the Japan Society of Mechanical Engineers, Jun. 2003, C edition, vol. 69, No. 682, pp. 1691-1698 (English Abstract).

(Continued)

Primary Examiner—Thomas G Black
Assistant Examiner—Lin B Olsen
(74) Attorney, Agent, or Firm—Drinker Biddle & Reath LLP

(57) ABSTRACT

A calibration device and method for automatically determining the position and the orientation of a robot used for measurement. First, an initial position of a preliminary position is generated based on a designated basic position, and it is judged whether the initial position is within an operation range of the robot. If the robot cannot reach the initial position, the preliminary position is adjusted close to the basic position. Otherwise, the preliminary position is evaluated by calculating an evaluation index of the preliminary position. When the evaluation index does not satisfy a predetermined condition, an initial value of an posture angle is increased.

6 Claims, 10 Drawing Sheets

U.S. PATENT DOCUMENTS

2008/0188986 A1* 8/2008 Hoppe ............... 700/263
2008/0319557 A1* 12/2008 Summers et al. ......... 700/19

FOREIGN PATENT DOCUMENTS

| | | |
|---|---|---|
| EP | 1 875 991 | 1/2008 |
| JP | 2005-135278 | 5/2005 |
| JP | 2005-201824 | 7/2005 |
| JP | 2005-342832 | 12/2005 |
| JP | 2006-110705 | 4/2006 |

OTHER PUBLICATIONS

Japanese Office Action dated Mar. 31, 2009 issued in Japanese Application No. 2007-25323 (including English translation and Statement of Verified Translation).

Japanese Office Action dated Jan. 6, 2009 issued in Japanese Application No. 2007-25323 (including English translation and Statement of Verified Translation).

Japanese Office Action dated Aug. 5, 2008 issued in Japanese Application No. 2007-25323 (including English translation and Statement of Verified Translation).

European Search Report dated Mar. 9, 2010 issued in EP Application No. 08001833.6.

* cited by examiner

CALIBRATION DEVICE AND METHOD FOR ROBOT MECHANISM

RELATED APPLICATIONS

The present application claims priority from Japanese Patent Application No. 2007-25323, filed on Feb. 5, 2007, the entire contents of which are fully incorporated herein by reference.

BACKGROUND OF THE INVENTION

1. Field of the Invention

The present invention relates to a calibration device and a calibration method for mechanical parameters of an industrial multi-jointed robot. In particular, the invention relates to a device and a method for automatically generating the position and the orientation a robot used for measuring in calibration.

2. Description of the Related Art

A method for positioning a robot with a high degree of accuracy is known, in which the relationship between inputted and outputted displacements of the robot is measured and the optimum values of the mechanical parameters of the robot is evaluated or corrected based on a measured result. Such a method for correction is generally referred to as "calibration". As generally known, the accuracy of the calibration depends on the measurement accuracy and an error model of the mechanism. Also, the accuracy of the calibration is greatly affected by the position and the orientation of the robot used for the measurement.

There are many methods for determination and evaluation of the position and orientation of a robot used for calibration. For example, a determination method used for the measurement and an evaluated value used for the evaluation are explained in Transactions of the Japan Society of Mechanical Engineers ("C" edition), vol. 69, No. 682 (2003-6), pp. 1691-1698. Also, Japanese Unexamined Patent Publication No. 2005-201824 discloses a measurement device for determining the direction of a view line from a light receiving device mounted on the front end of a robot arm, such as a camera or a PSD, to a target to be measured, by a method easier than using conventional calibration which needs a special calibration plate. In this measurement device, a light receiving surface of the light receiving device (typically, the camera) mounted on or near the front end of the robot art receives light from the target, the robot is moved to a position such that an image of the target is captured on a predetermined point (for example, the center of a camera image), and the position of the robot is stored. Based on such a function, the relationship between the robot and the view line of the camera can be determined by moving the robot so that the position and the orientation of the light receiving device are variously changed. Once the relationship is determined, by capturing the target by using the light receiving device from different two directions, the three-dimensional position of the target may be calculated based on a principle of stereo measurement.

As described above, there are many methods for calibration. On the other hand, in the industrial field in which the robot is used, the robot position during the calibration may be determined empirically. Alternatively, the robot position may be determined by equally dividing an operation range of the robot or calculating the probability distribution equivalent to the equal division. For example, the applicant has developed a calibration method using a measurement device having a noncontact-type light receiving device such as a camera, as described in Japanese Patent Publication (Kokai) No. 2005-201824 and Japanese Patent Application No. 2006-183375.

In the calibration as described above, it is desirable to automatically determine the position and the orientation of the robot for the measurement. In other words, a fully automated calibration is desired. At this point, the position and the orientation of the robot must satisfy the following two conditions: the robot can reach the position and the orientation; and the positioning accuracy of the robot must be improved by the calibration based on the measurement result at the position and the orientation.

One major problem regarding the calibration in the industrial field is that the selected position and the orientation of the robot cannot be appropriately judged until a series of operations of the calibration have taken place, including measuring, correcting and evaluating. In particular, when the position and the orientation of the robot empirically obtained cannot be used in the industrial field and the position and the orientation are changed corresponding to the environment of the industrial field, the result of the calibration cannot be predicted until the evaluating result is obtained. Therefore, if the positioning accuracy of the robot is low, it is necessary to remeasure or measure after the position and the orientation of the robot are changed, and evaluate the positioning accuracy again.

On the other hand, in the calibration described in the Transactions of the Japan Society of Mechanical Engineers ("C" edition), vol. 69, No. 682 (2003-6), pp. 1691-1698, there are many advanced methods regarding the previous evaluation and the selection of the position and the orientation of the robot for measurement. However, there are few methods that have put into practical use so as to adapt the industrial field. Because, the position and the orientation of the robot selected offline cannot always be implemented in the industrial field. In the industrial field of the robot, the operation range of the robot is often limited due to the existence of external equipment, such as processing equipment, safety fence, column, etc. Therefore, the position and orientation of the robot must be determined in view of such a limitation.

However, it is very difficult to formulate the operation range of the robot in view of interference between the robot and the above interfering articles. Even when the formulation is successful, the number of possible combinations of the positions and the orientations of the robot is generally enormous, whereby the formulation takes a lot of time. For example, in a case where three position parameters and three orientation parameters are prepared and each parameter includes three numeric values, the number of the combinations of the position and the orientation of the robot becomes 729. Further, when three combinations should be selected among the combinations, it is necessary to check more than sixty millions patterns. In order to reduce the calculation time, in the Transactions of the Japan Society of Mechanical Engineers ("C" edition), vol. 69, No. 682 (2003-6), pp. 1691-1698, an exploratory method is used. However, the exploratory method includes a trade-off problem: if the operation range of the robot is finely divided, the exploration time is long; or if the operation range is roughly divided, the exploration result is likely to diverge from the optimum value.

Also, the measurement device used in the calibration is generally an external device, whereby an installation error necessarily exists. Depending on the magnitude of the installation error, the target is not necessarily positioned within a measurement range of the measuring device at the position and the orientation generated offline. This may be also an obstacle to the practical use of an algorithm for automatically generating the position and the orientation of the robot.

SUMMARY OF THE INVENTION

Accordingly, an object of the present invention is to provide a calibration device for solving the above problems.

According to one aspect of the present invention, there is provided a device for calibrating a multi-jointed robot mechanism, comprising: an aligning part for carrying out an alignment in which the positional relationship between a first coordinate system fixed to a part of a robot and a second coordinate system fixed outside of the robot satisfies a predetermined condition; an initial position designating part for designating a position of the robot as an initial position, where the positional relationship between the first and second coordinate systems generally satisfies a predetermined condition, in order to carry out the alignment at a plurality of positions; a preliminary position determining part for automatically determining a plurality of preliminary positions for carry out the alignment, based on the initial position designated by the initial position designating part, the first coordinate system and a predetermined parameter; a judging part for judging, before the alignment is carried out, whether each of the plurality of preliminary positions determined by the preliminary position determining part is included in an operation range of the robot; and a position correcting part for correcting one or more preliminary position which is judged not to be included in the operation range of the robot, such that the one or more preliminary position is included in the operation range of the robot.

The device may further comprise an evaluating part for evaluating, before the alignment is carried out, whether an accuracy of the calibration using one or more preliminary position satisfies a predetermined criterion, in relation to all of the preliminary positions including the corrected position by the position correcting part; and a redetermining part for redetermining one or more preliminary position when the evaluating part evaluates that the accuracy of the calibration does not satisfy the predetermined criterion.

The device may further comprise a camera fixed on the outside of the robot; an image inputting part for inputting an image captured by the camera; a detecting part for detecting a target point on the first coordinate system included in the image inputted by the image inputting part; and a controller for controlling the robot such that the target point in the image detected by the detecting part satisfies a predetermined condition in order to carry out the alignment.

Alternatively, the device may further comprise a camera mounted near the front end of the robot; an image inputting part for inputting an image captured by the camera; a detecting part for detecting a target point on the second coordinate system included in the image inputted by the image inputting part; and a controller for controlling the robot such that the target point in the image detected by the detecting part satisfies a predetermined condition in order to carry out the alignment.

According to another aspect of the present invention, there is provided a method for calibrating a multi-jointed robot mechanism, comprising the steps of: carrying out an alignment in which the positional relationship between a first coordinate system fixed to a part of a robot and a second coordinate system fixed outside of the robot satisfies a predetermined condition; designating a position of the robot as an initial position, where the positional relationship between the first and second coordinate systems generally satisfies a predetermined condition, in order to carry out the alignment at a plurality of positions; automatically determining a plurality of preliminary positions for carry out the alignment, based on the designated initial position, the first coordinate system and a predetermined parameter; judging, before the alignment is carried out, whether each of the determined preliminary positions is included in an operation range of the robot; and correcting one or more preliminary position which is judged not to be included in the operation range of the robot, such that the one or more preliminary position is included in the operation range of the robot.

The method may further comprise the steps of evaluating, before the alignment is carried out, whether an accuracy of the calibration using one or more preliminary position satisfies a predetermined criterion, in relation to all of the preliminary positions including the corrected position; and redetermining one or more preliminary position when it is evaluated that the accuracy of the calibration does not satisfy the predetermined criterion.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
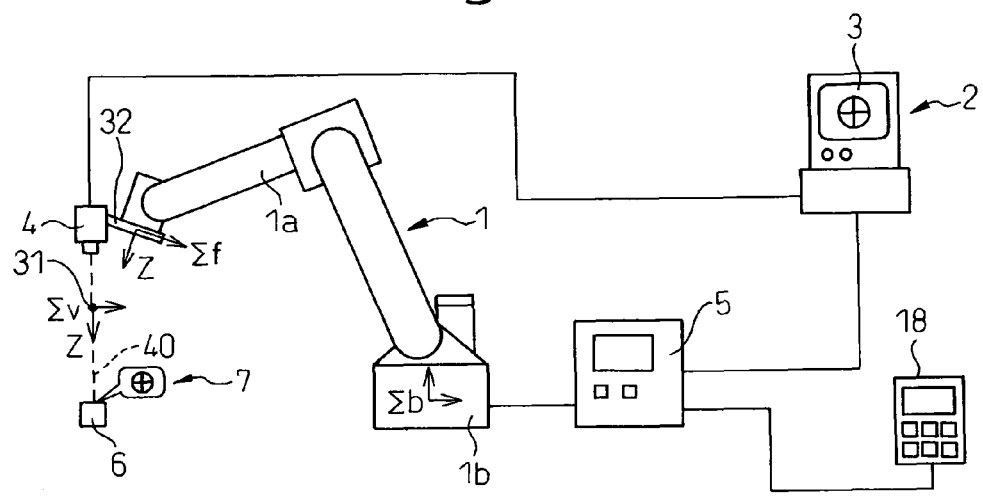
FIG. 1 is a diagram showing a schematic configuration of one embodiment according to the present invention.

As described above, in order to calibrate a robot mechanism, a relationship between input and output displacements of the robot must be measured. Generally, the input displacement means a displacement of each axis of the robot, and is detected by an encoder. Ideally, the output displacement is an absolute displacement of a point in a mechanical interface coordinated system of the robot in a stationary coordinate system. However, since a measurement device itself includes an installation error, a measuring object in relation to the output displacement is often a displacement of the point in the mechanical interface coordinate system relative to the stationary coordinate system.

In the present invention, in order to minimize an error generated by the measurement device, a measurement method is used, in which the position and the orientation angle of the robot are adjusted (or aligned) such that the positional relationship between a fixed point in the mechanical interface coordinate system of the robot and a fixed point in the stationary coordinate system satisfies a predetermined condition, and the position of the robot after the alignment is used as a measurement result. This measurement method does not require a specific measurement device. For example, the method may be a conventional touch-up method using a pin, or, an automatic measurement method using a non-contact type light receiving device such as a camera, as described in Japanese Patent Application No. 2006-183375, in which the measurement device does not need to be calibrated. In these methods, the position of the robot preliminarily selected does not always coincide with the measurement result. In other words, the fixed point in the mechanical interface coordinate system of the robot relative to the fixed point in the stationary coordinate system does not always coincide with a predetermined robot position. At this point, the preliminarily selected robot position and the obtained robot position as a measurement result are referred to as "a preliminary position" and "an aligned position", respectively. Further, in order to simplify identification calculation in the calibration, the position of aligned each axis is used as a representative value of the input displacement of the robot.

In a process for determining the preliminary position of the robot, first, one position of the robot is taught as an initial position, where the positional relationship between a fixed point in the mechanical interface coordinate system of the robot and a fixed point in the stationary coordinate system, within the operation range of the robot, generally satisfies a predetermined condition, corresponding to an actual usage environment of the robot. When a robot position at or near the center of the operation range of the robot is taught, other robot positions automatically generated are easily to be reached by the robot. Then, the position of the fixed point in the mechanical interface coordinate system is roughly determined such that a generated preliminary position is within a measurement range of the measurement device. After that, by using parameters of the preliminary position previously set, the preliminary position of the robot is automatically determined, based on the initial position, the roughly determined position of the fixed point of the mechanical interface coordinate system and the operational restriction of the robot. In relation to the determined preliminary position, first, it is judged whether the robot itself is within the considered operation range. When the robot cannot reach a preliminary position, such a preliminary position is adjusted to approach the initial position within the actual operation range. Due to this method, the preliminary position of the robot within the operation range may be obtained by a small amount of computation. If the robot cannot reach one or more preliminary position, such a preliminary position may be adjusted toward the initial position independently of the offline environment and the field environment. Therefore, a plurality of preliminary positions within the operation range of the robot may be easily obtained by a small amount of computation and less teaching time. Further, by combining a measurement device such as a camera with the calibration device, a series of process as described above may be automated.

By improving the practicality of the automated preliminary position as described above, prior to carry out the actual alignment, the relationship between the plurality of preliminary positions and the calibration result may be evaluated by using a known evaluation criterion. By presenting the evaluated result to the operator and adjusting or adding a preliminary position of the robot based on the result, the time required for trial and error may be reduced and an efficiency of the calibration may be improved.

The present invention is different from the prior art in that more practical preliminary positions may be obtained, and further, the optimization of a set of preliminary positions may be done by adjusting each preliminary position according to the operation range of the robot. Therefore, in the invention, the trade-off problem of the exploratory method in which the exploration time becomes longer as the operation range of the robot is finely divided.

The present invention will be described below with reference to the drawings. FIG. 1 shows a schematic configuration of a measuring system according to one embodiment of the present invention. As shown in FIG. 1, a robot 1, which may be a typical multi-jointed robot having an arm portion 1a and a base portion 1b, is connected to a robot controller 5. A camera 4 is attached to a tool attachment surface 32 or a front end of the arm portion 1a. In the robot 1, a robot coordinate system $\Sigma b$ is set and fixed to the robot base portion 1b and a mechanical interface coordinate system $\Sigma f$ is set and fixed to the tool attachment surface 32. The robot controller 5 may be informed of the position of the origin and the orientation of the mechanical interface coordinate system $\Sigma f$, as needed. A teaching board 18 having a conventional manual key is connected to the robot controller 5, whereby an operator may operate the robot 1 by means of the manual key.

The camera 4 is a CCD camera, for example, which is a conventional light receiving device capable of capturing and detecting a two-dimensional image on a light receiving surface (or a CCD array) thereof. The camera 4 is connected to an image processing unit 2 having a monitor 3 such as a LCD, a CRT or the like. In the embodiment, the camera 4 may image a mark 7 on a target 6 arranged in a space represented by the robot coordinate system $\Sigma b$.

Figure 2:
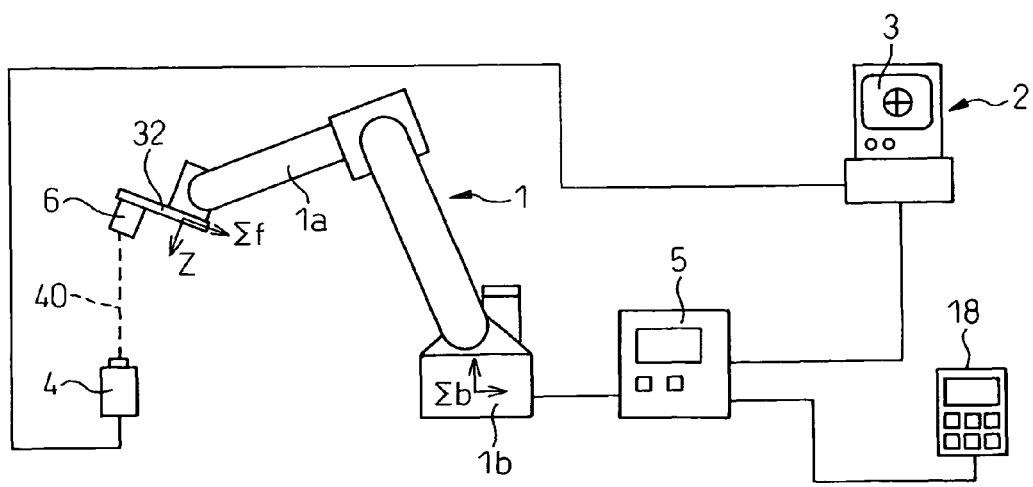
FIG. 2 is a diagram showing a schematic configuration of another embodiment according to the present invention.

On the other hand, in another embodiment of the invention as shown in FIG. 2, the target 6 may be fixed to the tool attachment surface 32 or the mechanical interface coordinate system $\Sigma f$ and the camera 4 may be arranged in a space represented by the robot coordinate system $\Sigma b$. In this way, the light receiving device and the target may be relatively freely arranged. Further, since the positional relationship between the light receiving device and the target may be automatically and precisely adjusted as described below, it is not necessary to control the accuracy regarding the arrangement of the light receiving device and the target.

Figure 3:
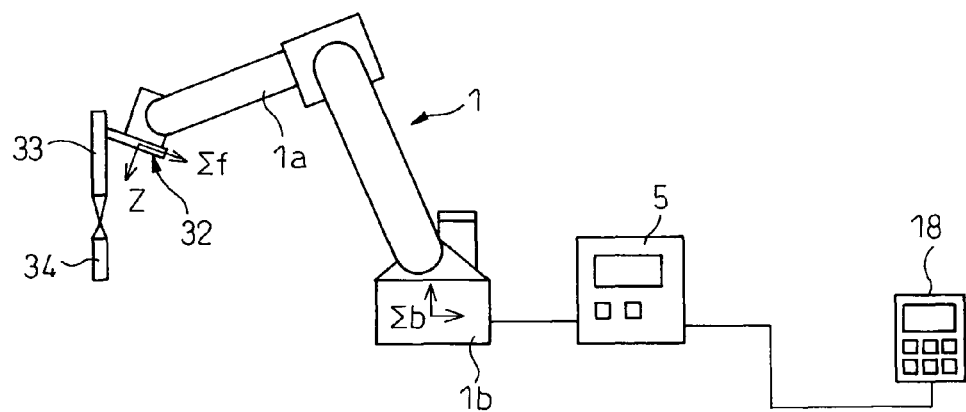
FIG. 3 is a diagram showing a schematic configuration of still another embodiment according to the present invention.

Also, as shown in FIG. 3, a designated point (for example, an apex of a pin 33) fixed to the mechanical interface coordinate system $\Sigma f$ may be aligned with an apex of a touch-up pin 34 on the stationary coordinate system.

Figure 4:
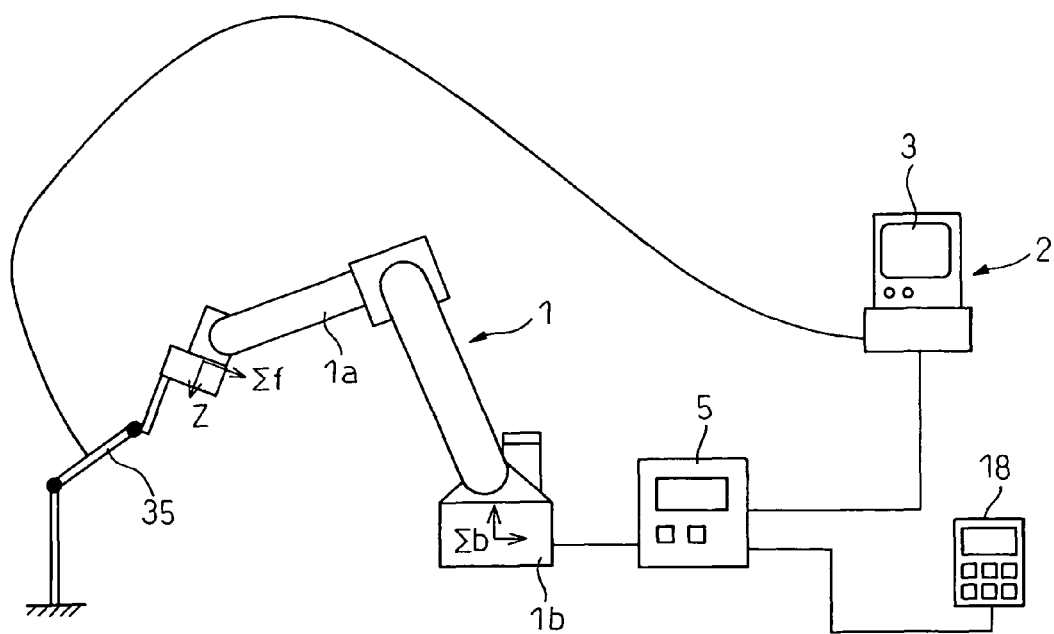
FIG. 4 is a diagram showing a schematic configuration of still another embodiment according to the present invention.

Further, as shown in FIG. 4, instead of aligning the designated point such as the apex of the pin 33 fixed to the coordinate system $\Sigma f$, the position of the designated point may be directly measured. As an usable measurement device in this case, a one-directional measurement device such as a laser interferometer or a double-ball bar 35, a two-dimensional measurement device such as a camera or a cross grid encoder (KGM), and a three-dimensional measurement device such as a laser tracking system. Since the procedure of measurement in the system of FIGS. 2 to 4 may be the same of that of FIG. 1, the explanation below is related to the system of FIG. 1.

Figure 5:
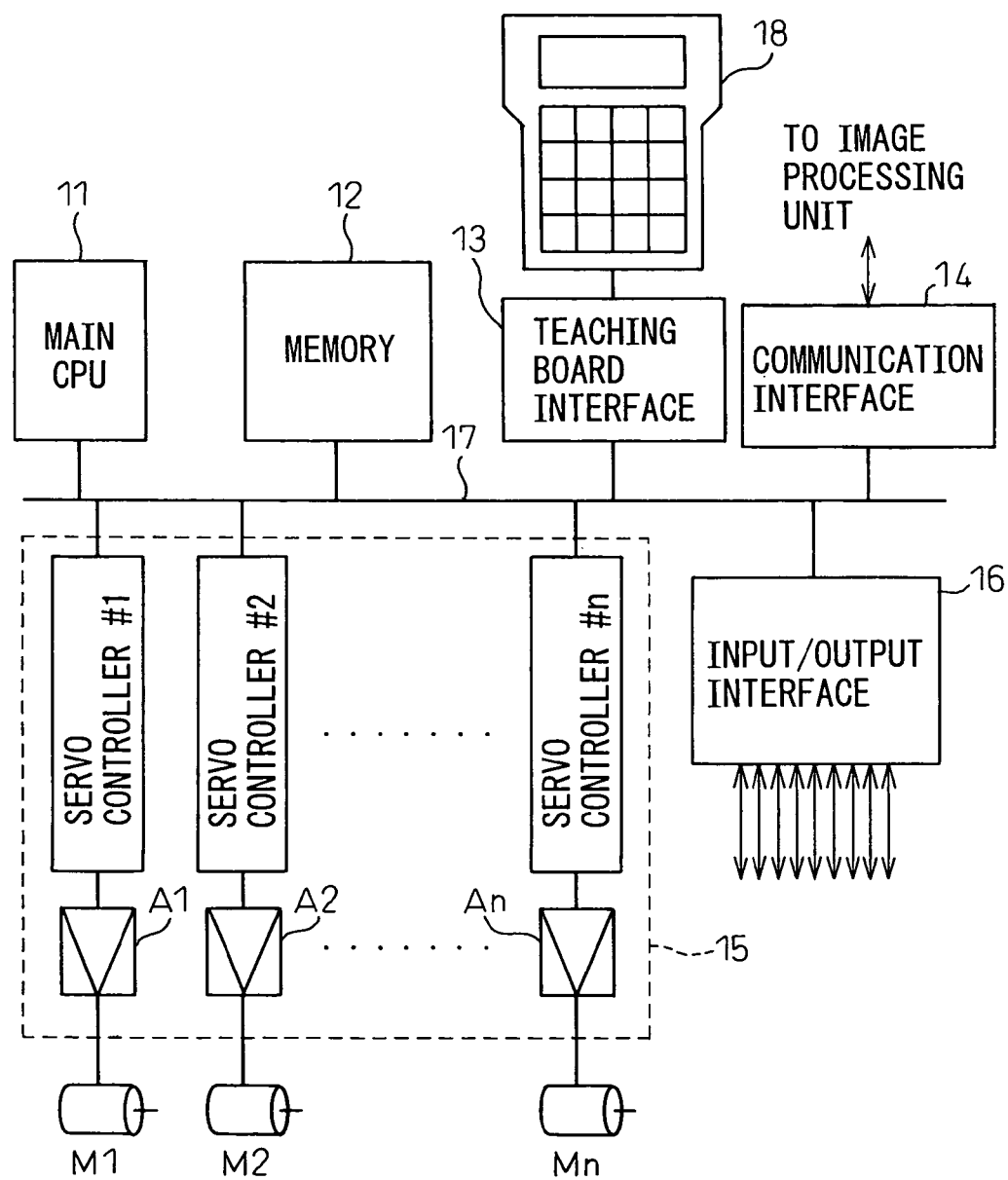
FIG. 5 is a diagram showing a block configuration of a robot controller used in the embodiment.

FIG. 5 shows a block configuration of the robot controller 5. The robot controller 5 has a main CPU (a main central processing unit; hereinafter, simply referred to as a CPU) 11, a memory 12 including a RAM (random access memory), a ROM (read-only memory) and a non-volatile memory, a teaching board interface 13, a communication interface 14, a servo control unit 15 and an input/output interface 16 for external units, which are connected each other in parallel via a bus 17.

The teaching board 18 connected to the teaching board interface 13 may have usual display functions. The operator prepares, corrects, and registers a motion program for the robot by manually operating the teaching board 18. The operator also sets various parameters, operates the robot based on the taught motion program, and jog feeds, in the manual mode. A system program, for supporting the basic function of the robot and the robot controller, is stored in the ROM of the memory 12. The motion program of the robot taught according to the application and relevant set data are stored in the non-volatile memory of the memory 12. Also, a program and parameters used to carry out processes (for movement of the robot to calculate mechanical parameters and for communication with the image processing unit therefor) as described below are also stored in the non-volatile memory of the memory 12.

The RAM of the memory 12 is used for a storage area to temporarily store various data processed by the CPU 11. The servo control unit 15 has servo controllers #1 to #n, where n is a total number of axes of the robot, and n is assumed to be equal to 6 in this case. The servo control unit 15 receives a shift command prepared through operations (such as a path plan preparation, and interpolation and an inverse transformation based on the plan) to control the robot. The servo control unit 15 outputs torque commands to servo amplifiers A1 to An based on the shift command and feedback signals received from pulse coders not shown belonging to the axes. The servo amplifiers A1 to An supply currents to servomotors of the respective axes based on the torque commands, whereby driving the servomotors. The communication interface 14 is connected to the image processing unit 2 (FIG. 1). The robot controller 5 exchanges commands relevant to measurement and measured data described below with the image processing unit 2 via the communication interface 14.

Figure 6:
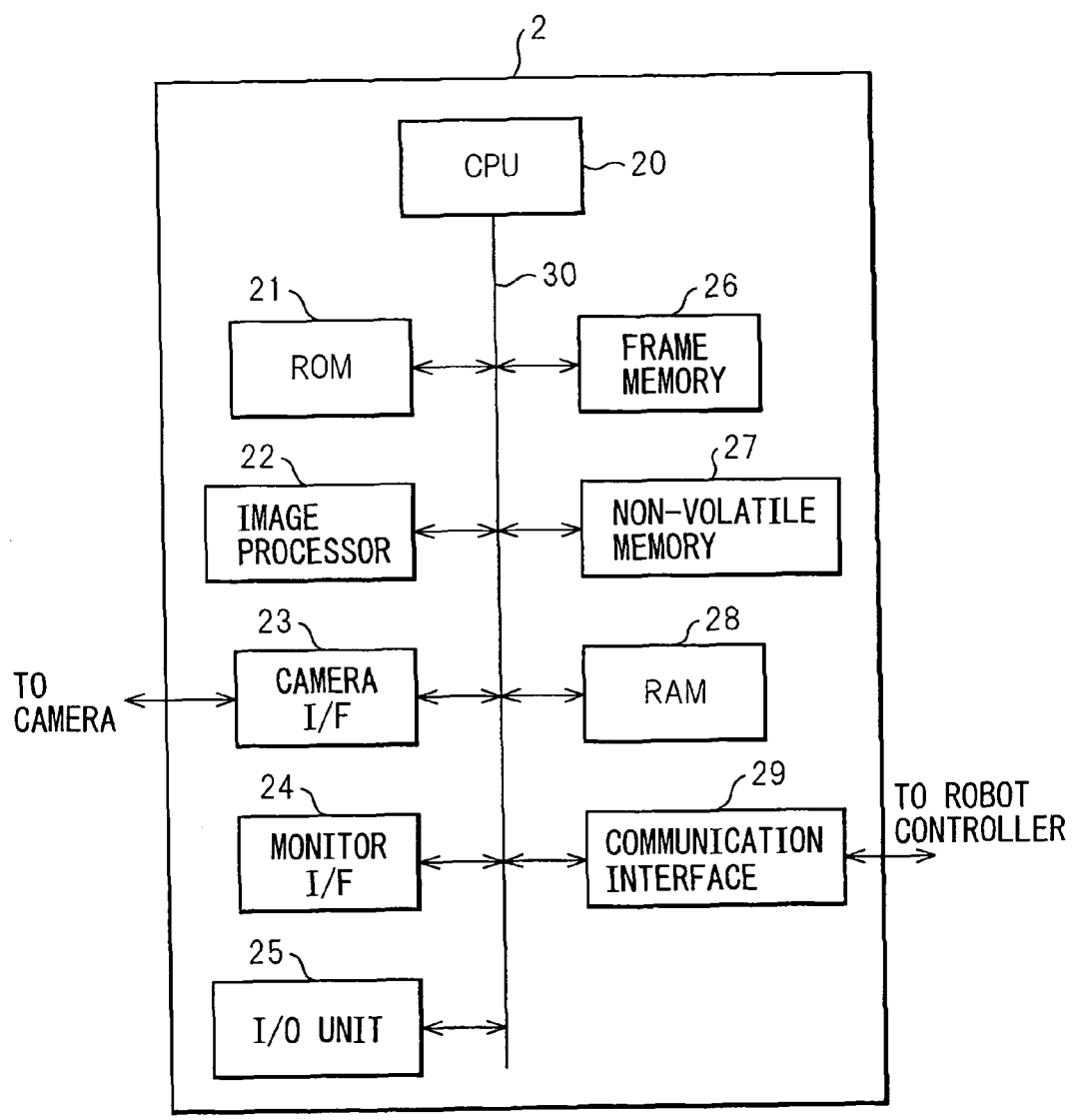
FIG. 6 is a diagram showing a block configuration of an image processor used in the embodiment.

The image processing unit 2 has a block configuration as shown in FIG. 6. The image processing unit 2 has a CPU 20 including a microprocessor, and also has a ROM 21, an image processor 22, a camera interface 23, a monitor interface 24, an input/output (I/O) unit 25, a frame memory (i.e., an image memory) 26, a non-volatile memory 27, a RAM 28 and a communication interface 29, that are connected to the CPU 20 via a bus line 30.

A camera as an imaging unit, which is a CCD camera in this case, is connected to the camera interface 23. When the camera receives an imaging command via the camera interface 23, the camera picks up an image using an electronic shutter function incorporated in the camera. The camera sends a picked-up video signal to the frame memory 26 via the camera interface 23, and the frame memory 26 stores the video signal in the form of a grayscale signal. The monitor (FIG. 1) such as a LCD, a CRT or the like is connected to the monitor interface 24. The monitor displays images currently picked up by the camera, past images stored in the frame memory 26, or images processed by the image processor 22, as required.

As shown in FIG. 1, the camera 4 images the mark 7 on the target 6 arranged in a space represented by the robot coordinate system $\Sigma b$. The image processor 22 analyses the video signal of the image of the mark 7 stored in the frame memory 26 and, the two-dimensional position and the size of the mark is calculated, as described later in detail. A program and parameters for this purpose are stored in the non-volatile memory 27. The RAM 28 temporarily stores data used by the CPU 20 so as to execute various processing. The communication interface 29 is connected to the robot controller 5 via the communication interface 14 at the robot controller side.

FIG. 1 shows a view line 40 of the camera 4 extending from a representative point (for example a center of the light receiving surface) of the camera 4 to the target 6. A coordinate system $\Sigma v$ as shown in FIG. 1 relates to the view line 40 extending from the representative point of the camera to the target 6. The origin of the coordinate system $\Sigma v$ is positioned on the view line 40 and one axis of the coordinate system (for example, Z axis) coincides with the view line 40. As described above, the mechanical interface coordinate system $\Sigma f$ represents the position and the orientation of the tool attachment surface 32. The coordinate system $\Sigma f$ in this case also represents the position and the orientation (an angle of orientation) of the robot 1. Unless otherwise noted, the expression "the position of the robot" means "the position of the origin of the mechanical interface coordinate system $\Sigma f$ on the robot coordinate system $\Sigma b$". Further, when the orientation of the robot also should be considered, the former expression means "the position and the orientation of the origin of the mechanical interface coordinate system $\Sigma f$ on the robot coordinate system $\Sigma b$". Therefore, unless otherwise noted, the term "alignment" also means that the both of the position and the orientation are aligned.

Next, a procedure of calibration according to the invention by using the configuration of FIG. 1 will be described with reference to a flowchart of FIG. 7. Generally, before a series of steps of the procedure are executed, the positional relationship between the robot, the target and the camera is unknown. Therefore, it is necessary to predetermine the relationship between the direction and the distance of movement of the target in the image and the direction and the distance of movement of the robot (in other words, how the robot should be moved in order to move the target in the image by a desired distance in a desired direction). For example, by moving the robot in an arbitrary direction in the coordinate system $\Sigma f$ more than once detecting the feature of the shape of the mark 7 imaged on the light receiving surface each time, the relationship between the direction and the distance of each axis of the robot and the change of the feature of the target may be calculated. Since the method for calculating the relationship regarding the direction and the distance of the robot is known, a detailed description thereof is omitted. This predetermination is finished before the below steps are executed.

Step T1

In the invention, the mark 7 of the target only has to be within the field of vision of the camera 4. In other words, it is not necessary to precisely position the camera and the target. In step T1, the operator operates the robot such that the mark 7 is within the field of vision of the camera 4 (concretely, the mark 7 is indicated in the monitor 3 of the image processing unit 2). Then, the position of the robot after moving is taught as an initial position.

Step T2

In step T2, a method described in Japanese Patent Application No. 2006-183375, filed by the applicant of the present application, is improved. The position of a gaze point 31 of the camera in the mechanical interface coordinate system $\Sigma f$ and the position of a prescribed point of the mark 7 in the robot coordinate system $\Sigma b$ (for example, a TCP) are automatically calculated, and simultaneously, the gaze point 31 of the camera is moved to coincide with the prescribed point of the mark 7. In this method, the camera images the prescribed point of the mark 7 from different directions (or in a plurality of positions of the robot), so as to calculate the position the gaze point 31 in the coordinate system $\Sigma f$ and the position of the prescribed point of the mark 7 in the coordinate system $\Sigma b$. This method is similar to a conventional method in which a tool center point (TCP) attached to the mechanical interface coordinate system $\Sigma f$ is mechanically "touched-up" or aligned with a prescribed point in the robot coordinate system Σb from different directions, so as to calculate the positions of the TCP and the prescribed point. Therefore, a detailed description of the method is omitted. In this step, it is not necessary to precisely calculate the positions of the camera and the target. In other words, it is sufficient to keep the target within the field of vision of the camera even when the orientation of the robot is changed around the gaze point of the camera while keeping the state in which the gaze point is aligned with the prescribed point of the target. Therefore, as long as the target is within the field of vision of the camera, a value of the TCP may be set by visual observation or by using a designed value.

Step T3

Figure 8:
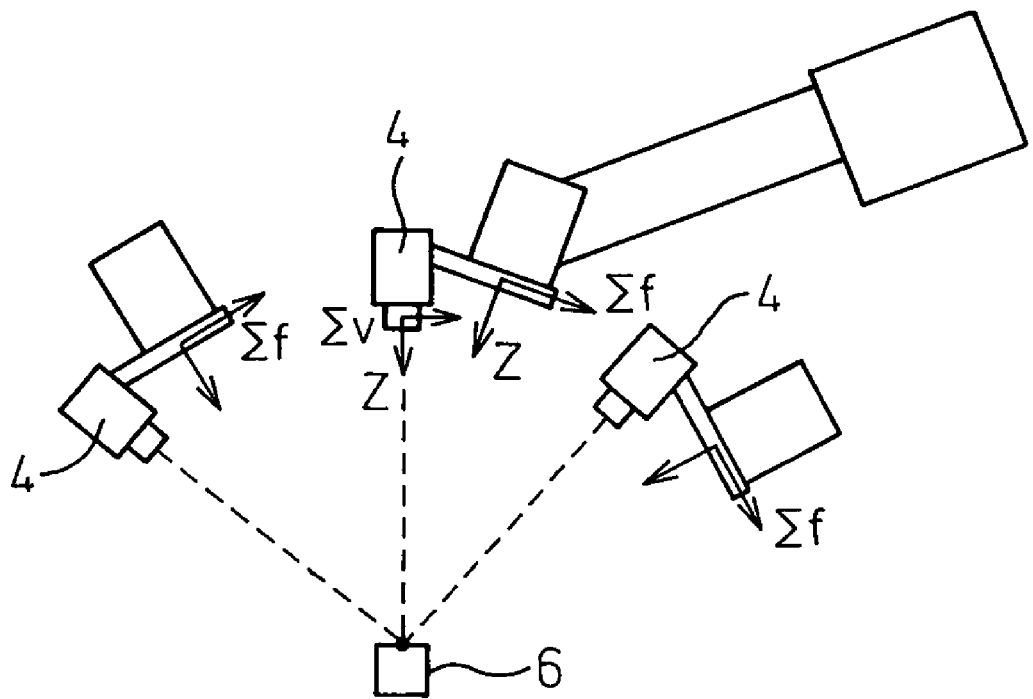
FIG. 8 is an explanatory diagram of the process of step T3 of FIG. 7.

In step T3, based on the calculated position the gaze point 31 in the coordinate system Σf and the calculated position of the prescribed point of the mark 7 in the coordinate system Σb, a plurality of preliminary positions of the robot, contained in the operation range of the robot, are automatically calculated and stored in the memory. In an example of the plurality of the preliminary positions of the robot, the distance between the camera 4 and the prescribed point (e.g., the center) of the mark 7 in each preliminary position is constant and the slope of the view line extending through the prescribed point in each preliminary position is different, otherwise, the distance between the camera 4 and the prescribed point of the mark 7 in each preliminary position is different and the slope of the view line extending through the prescribed point in each preliminary position is constant. FIG. 8 shows the former case, i.e., in which the distance between the camera 4 and the prescribed point of the mark 7 in each of three preliminary positions is constant and the slope of the view line extending through the prescribed point in each preliminary position is different. The detail of step T3 is described below.

Steps T4 and T5

In step T4, "automatic touch-up operation" as described below is executed from each preliminary position, as a start position, determined and stored in step T3. Then, the robot is moved such that the feature of the mark 7 imaged on the light receiving surface satisfies a predetermined condition. Next, the position of the robot after the movement (or the position after the alignment) is stored in the memory in step T5. In other words, a plurality of aligned positions are stored in the memory, corresponding to the start positions or the plurality of preliminary positions.

As the "automatic touch-up operation", for example, a method described in Japanese Unexamined Patent Publication No. 2005-201824, filed by the applicant of the present application, is preferred. In other words, the invention is based on the movement of the robot such that a value or a parameter representing the geometrical feature of the mark 7 imaged on the light receiving surface satisfies the predetermined condition in relation to a plurality of different robot positions.

Figure 9:
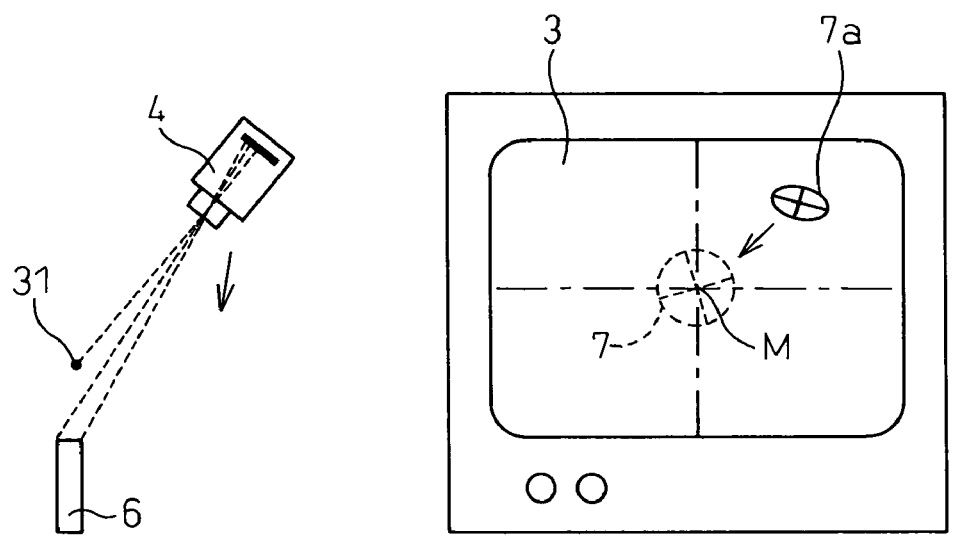
FIG. 9 is a diagram showing a monitor and the positional relationship between a camera and a target.
Figure 10:
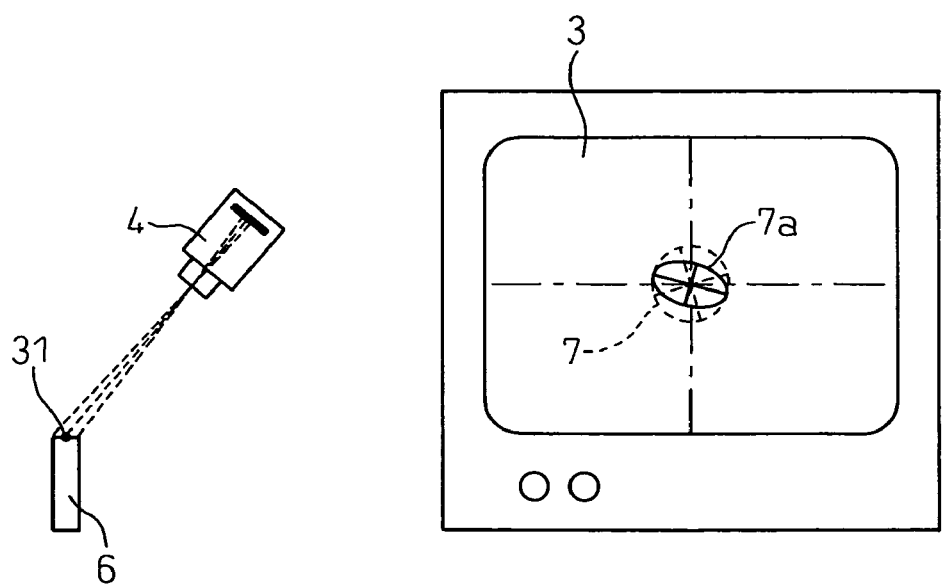
FIG. 10 is a diagram showing the state in which the target is aligned to a certain position from the position of FIG. 9.

At this point, the process for moving the robot such that a value representing the geometrical feature of the mark 7 imaged on the light receiving surface of the camera 4 satisfies the predetermined condition in relation to one preliminary position, is explained with reference to FIGS. 9 and 10. in this case, the mark 7 is constituted by a circle with cross lines marking the center of the circle, as shown in FIG. 1. The feature of an image 7a of the mark 7 on the light receiving surface includes the position of the center and the length of a log axis of an ellipse, as shown in FIGS. 9 and 10. Since the mark 7 is not opposed to the light receiving surface face to face in many cases, the shape of the image 7a becomes the ellipse. FIGS. 9 and 10 show the process for moving the center of the ellipse to a certain point (in this case, the center point M of the light receiving surface) and aligning the ellipse such that the length of the long axis of the ellipse coincide with a certain value (in this case, the diameter of the mark 7). FIGS. 9 and 10 also show the change of the positional relationship between the camera 4 and the target 6. FIG. 9 shows the state in which the ellipse 7a is offset from the point M and the length of the long axis of the ellipse is smaller than the diameter of the mark 7. FIG. 10 shows the state in which the positional relationship between the camera 4 and the target 6 is changed by moving the robot 1 such that the center of the ellipse is aligned with the point M and the length of the long axis of the ellipse coincides with the diameter of the mark 7. Concretely, by automatically executing the above process, the difference between the centers of the ellipse and the circle, and the difference between the long axis of the ellipse and the diameter of the circle are within a certain error range. On the light receiving surface, the feature value of the ellipse may be detected by image processing (a detail of which is omitted, since various known method may be used for image processing), whereby the difference between the feature value and the predetermined value may be calculated.

Step T6

In this step, mechanical parameters of the robot are determined by identifying calculation using the plurality of robot positions stored in step T5 when the "automatic touch-up operation" is completed. The mechanical parameters, to be corrected in the invention, include parameters contained in a relational expression used for controlling the robot, for determining the correlation between the displacement of each drive axis of the robot (or an input) and the position of the front end of the robot (or an output). The representative parameter is the length of each link or the position of the origin of each axis. Otherwise, a backlash generated due to the rotation of the axis, the amount of elastic deformation of the link or a reducer may be possible. In the invention, the mechanical parameter determined by identifying calculation is not limited to a specified one, in other words, the possible parameter is one which can be formulated and is independent from other parameters.

Next, a method for calculating the mechanical parameter of the robot will be explained on the assuming that the gaze point 31 of the camera 4 coincides with the prescribed point of the mark 7 at all aligned positions. Before the calibration, only a set value or an initial value $P_0$ of the mechanical parameter is known, and a true value P of the mechanical parameter is determined by calculating an error δ between the values P and $P_0$. At this point, errors of the mechanical parameters, for identifying calculation of errors of $n_p$-number of mechanical parameters $P_{k,0}=[P_{k,0,1}, P_{k,0,2}, \ldots, P_{k,0,np}]$, errors of the position of the gaze point 31 $P_s=[X_s, Y_s, Z_s]$ on Σf and errors of the position of the prescribed point of the mark 7 $P_m=[X_m, Y_m, Z_m]$ on Σb, are defined as $P_{ID}=[\Delta P_k, \Delta P_s, \Delta P_m]$. In an ideal condition (i.e., all components of $P_{ID}$ are equal to zero), the position $P_i$ of the gaze point 31, calculated by the position $P_s$ of the gaze point 31 on Σf and the position of the robot when the automatic touch-up operation is finished corresponding to stored i-th position/orientation for measurement, definitely coincides with the position $P_m$ of the prescribed point of the mark 7 on Σb. However, errors $e_i$ are generated between the positions $P_i$ and $P_m$, due to the error $P_{ID}$ including the error of the mechanical parameter, as shown in equation (1) below.

$$e_i = P_i - P_m \tag{1}$$

As will be understood from the geometrical relationship when the value of each axis is assumed to be constant, the value $P_i$ is represented as a function of the value $P_{ID}$. Accordingly, the error $e_i$ is also a function of the value $P_{ID}$.

In the embodiment, by using a Newton-Raphson method, an optimum $P_{ID}$ is calculated such that an error $E=[e_1, e_2, \ldots, e_{ns}]$, between the position $P_i$ of the gaze point 31 on $\Sigma b$ at $n_s$-number of aligned positions and the position $P_m$ of the prescribed point of the mark 7 on $\Sigma b$, is minimized. In this calculation, as shown in equation (2), a differential value $g_{i,j}$ corresponding to a j-th identifying parameter $P_{ID,j}$ of the error $e_i$ is calculated.

$$g_{i,j}=de_i/dP_{ID,j}=(e'_{i,j}-e_i)/\Delta P_{ID,j} \qquad (2)$$

At this point, the value $e'_{i,j}$ is an error, when a minute error value $\Delta P_{ID,j}$ is added to the value $P_{ID,j}$, between the position $P'_i$ of the gaze point 31 on $\Sigma b$ at i-th aligned position and the position $P_m$ of the prescribed point of the mark 7 on $\Sigma b$.

By using equation (2), the calculated $g_{i,j}$ may be represented as a matrix [G], as shown in equation (3).

$$[G] = \begin{vmatrix} g_{1,1}^T & \cdots & g_{1,j}^T & \cdots & g_{1,ne}^T \\ \vdots & & \vdots & & \vdots \\ g_{i,1}^T & \cdots & g_{i,j}^T & \cdots & g_{i,ne}^T \\ \vdots & & \vdots & & \vdots \\ g_{ns,1}^T & \cdots & g_{ns,j}^T & \cdots & g_{ns,ne}^T \end{vmatrix} \qquad (3)$$

By using the matrix [G], the relation of error may be represented by equation (4).

$$E^T = [G]P_{ID}^T \qquad (4)$$

Therefore, the value $P_{ID}$ may be calculated by equation (5).

$$P_{ID}^T = [G]^+ E^T \qquad (5)$$

At this point, $[G]^+$ is a pseudo inverse matrix of the matrix [G] and calculated by equation (6).

$$[G]^+ = ([G]^T[G])^{-1}[G]^T \qquad (6)$$

By the above equations, the mechanical parameters $P_{k,l}$ may be calculated by equation (7).

$$[P_{k,l}, P_{s,l}, P_{m,l}] = [P_{k,0}, P_{s,0}, P_{m,0}] + P_{ID} \qquad (7)$$

Since the values $P_{ID}$ and $P_i$ have a nonlinear relationship, the value $[P_{k,l}, P_{s,l}, P_{m,l}]$ calculated by equation (7) still includes an error. Therefore, based on the Newton-Raphson method, equations (1) to (7) are repeated until all components of $P_{ID}$ become minimal values, by using the value $[P_{k,l}, P_{s,l}, P_{m,l}]$ instead of the value $[P_{k,0}, P_{s,0}, P_{m,0}]$. In effect, the above equations are repeated until each component of $P_{ID}$ is equal to or lower than a predetermined threshold. As another calculation method used for calibration, an optimization approach for nonlinear problem, such as a genetic algorithm method or a neural network, may be possible, the details of which are omitted since these approaches are known.

Step T7

In step T7, the prior mechanical parameters of the robot stored in the robot controller is overwritten with the calculated mechanical parameters, so as to reflect the calculated parameters in the robot control.

Figure 11:
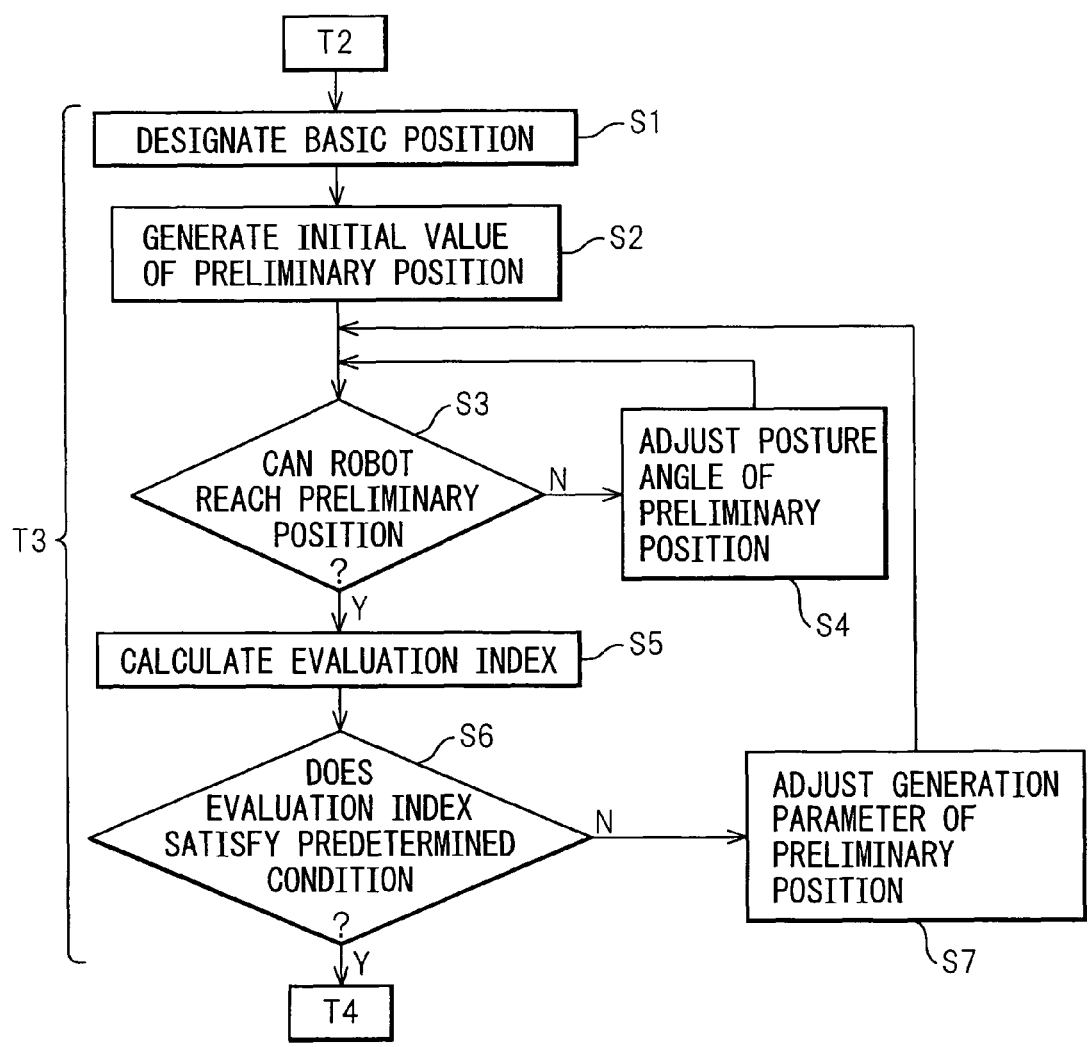
FIG. 11 is a flowchart showing a detail of step T3 of FIG. 7.

FIG. 11 shows a flowchart indicating a detail of step T3, i.e., the process for automatically determining or generating the preliminary position and evaluating the preliminary position. A point of each step in step T3 is explained below.

Step S1

Figure 7:
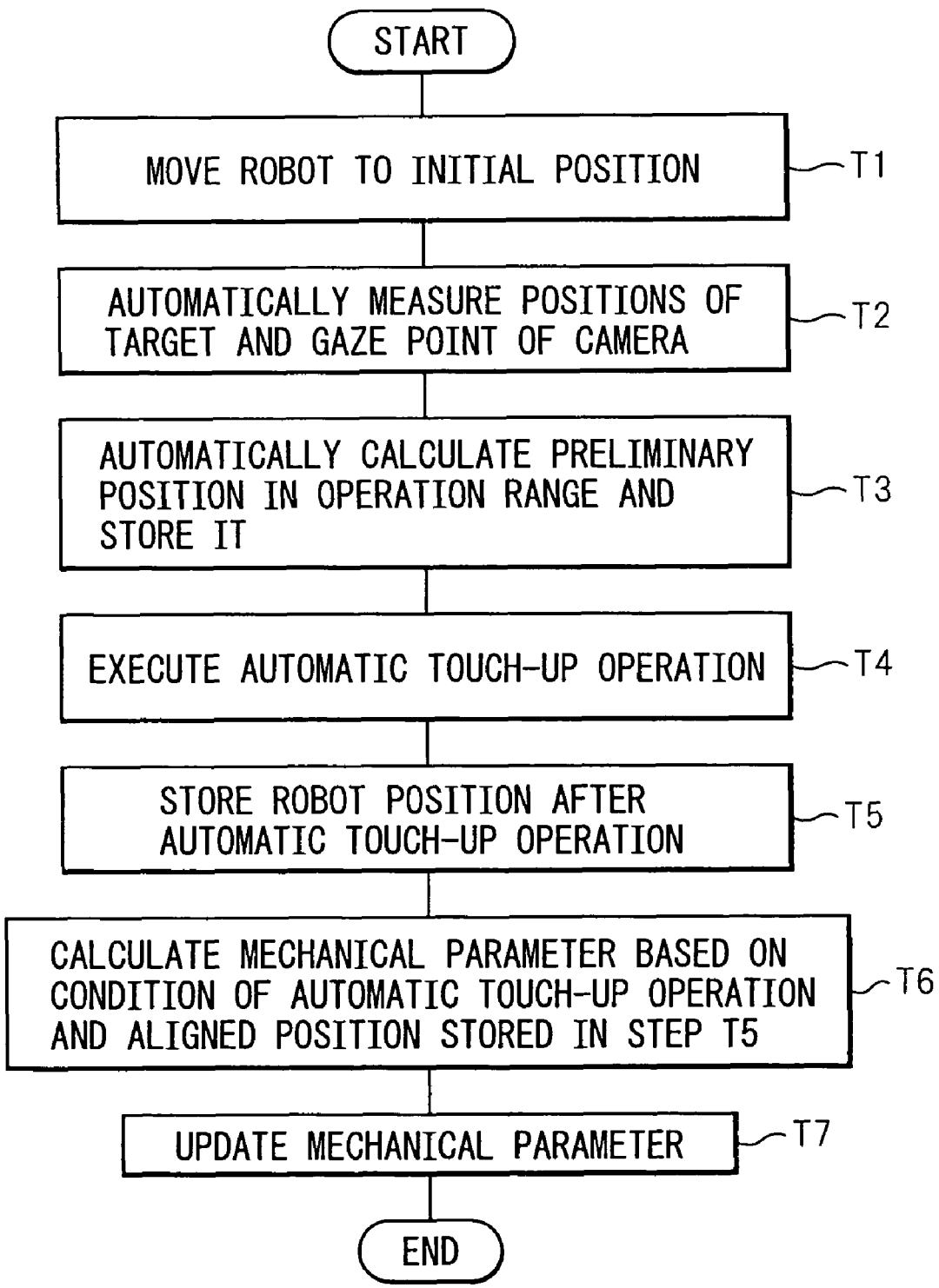
FIG. 7 is a flowchart showing an overall procedure executed in the embodiment.

First, the robot position is designated as a basic position, where the gaze point 31 of the camera coincides with the prescribed point of the mark 7 in step T2 of FIG. 7. The function of the basic position is similar to the initial position. However, a preliminary position generated based on the basic position is closer the position after the alignment than a preliminary position generated based on the initial position.

Step S2

As shown in equation (8) below, by adding determined values ($dW_{iW}$, $dP_{iP}$, $dR_{iR}$) to posture roll angle, pitch and yaw angle ($W_0$, $P_0$, $R_0$) of the robot basic position, initial values ($W_1$, $P_1$, $R_1$) of a robot preliminary position are generated. In this case, $i_w=1, \ldots, n_w$, $i_p=1, \ldots, n_p$, and $i_R=1, \ldots, n_R$.

$$(W_1, P_1, R_1) = (W_0 + dW_{iW}, P_0 + dP_{iP}, R_0 + dR_{iR}) \qquad (8)$$

Step S3

It is judged whether the robot can reach the preliminary position generated in step S2. A criterion of judgment is that the initial value of the preliminary position is within the operation range of the robot, and/or that the robot does not interfere with external equipments. Concretely, in the former criterion, it is judged whether the displacement of each robot axis is possible and does not exceed a limit value, further, the initial value of the preliminary position is not a singular point. On the other hand, in the latter criterion, it is judged whether each part of the robot corresponding to the initial value of the preliminary position does not included in a predetermined interference area.

Step S4

When it is judged that the robot cannot reach the initial value of the preliminary position, the preliminary position is adjusted to close to the basic position. Concretely, an exploratory method may be possible, in which the posture angle included in the preliminary position is close to that of the basic position by using a predetermined step value, by repeatedly using equation (9) below.

$$(W_n, P_n, R_n) = ((W_{n-1} - W_0) \times k_w + W_0, (P_{n-1} - P_0) \times k_p + P_0, (R_{n-1} - R_0) \times k_R + R_0) \qquad (9)$$

where $0 < k_w, k_p, k_R < 1$

At this point, depending on the values $k_w$, $k_p$ and $k_R$ used in equation (9), the obtained posture angle may be too close to the center of the operation range of the robot. In this case, a more accurate exploratory approach may be possible by using the obtained exploratory result. In other words, the values of $k_w$, $k_p$ and $k_R$ are reduced so as to search optimum value near the boundary of the operation range. Since a method for optimizing the accuracy and the time for exploratory approach in variable operation range is known, the detail of this is omitted. As another method for closing the posture angle of the preliminary position to that of the basic position, a predetermined value may be added to each component of $(W_{n-1}, P_{n-1}, R_{n-1})$, instead of using equation (9). Also, the added predetermined value may be variable.

Step S5

Since the identifying mechanical parameter of the error may include an error, the preliminary position is evaluated in step S5. As a cause of the error, the imperfection of an error model and/or a measurement error may be possible. On the other hand, regardless of a calibration method of the mechanical parameter in the calibration, the above equation (4) is always true. Therefore, the relationship between a calculation error $\Delta P_{ID}$ of the mechanical parameter and a measurement data error $\Delta E$ due to the imperfection of the error model and the measurement error, is represented by equation (10) below.

$$\Delta P_{ID} = [G]^+ \Delta E \qquad (10)$$

The relationship between the mechanical parameter error $\Delta P_{ID}$ and a positioning error $\delta E$ of the robot in the field is represented by equation (11) below. In this case, [G'] is a matrix including an input/output relationship corresponding to all robot positions in the field.

$$\delta E = [G']\Delta P_{ID} \tag{11}$$

Since the aligned positions in the calibration are generally broadly dispersed in the operation range, the matrix [G'] in equation (11) may be rewritten by using the matrix [G] in equation (10). Therefore, the relationship between the positioning error δE after the calibration and the measurement data error ΔE is represented by equation (12) below.

$$\delta E = [G][G]^+ \Delta E \tag{12}$$

Generally, in the same kind of mass-produced robots, the magnitudes of repetitive errors in the robots are approximately equal. The same can be applied to the magnitude of the measurement errors of the same kind of measurement devices such as a camera. Therefore, it is expected that the measurement data error ΔE has generally the same level as long as the same kind of robots and measurement devices are used. At this point, the positioning error pf the robot after the calibration may be generally figured out if the matrixes [G] and [G]$^+$ can be evaluated. Also, when the preliminary position is not significantly different from the aligned position, the matrix [G] may be calculated by determining the preliminary position, whereby the positioning error of the robot after the calibration may be previously evaluated without the alignment.

An example of a method for representing the matrix [G] by using one value is explained below. By using a singular value v of the matrix [G], an evaluation index EI of [G][G]$^+$ is calculated by equation (13) below.

$$EI = \sigma_{[G]max} \times \sigma_{[G]+max} = \sigma_{[G]max}/\sigma_{[G]min} \tag{13}$$

Also, the index EI may be calculated by equation (14) below, which includes less calculation amount.

$$EI = ||[G]|| \times ||[G]^+|| \tag{14}$$

In this case, ||[G]|| may be calculated by equation (15) below, by using a sum ||h$_j$|| of an absolute value of each component of j-th row vector of [G].

$$||[G]|| = \max ||h_j|| \tag{15}$$

It is apparently possible to use [G]$^T$[G] in which more preliminary position are used and the matrix [G] is a non-square matrix, instead of using the matrix [G], whereby the measurement error may be reduced. Also, a normal matrix may be used. In addition, a study is already disclosed, in which only the matrix [G] or [G]$^+$ is evaluated, without evaluating the product [G][G]$^+$, and a product of all singular points is used as a representative value instead of using a maximum singular value of [G] as the representative value.

Steps S6 and S7

In step S6, if the combination of the preliminary positions or a set of evaluation index does not satisfy a predetermined condition (or does not reach a certain threshold), a defined value of posture angle is increased so as to increase the set of evaluation index of the preliminary positions, as shown in equation (16), in step S7. In this case, each value $A_w$, $A_p$, $A_R$ is larger than one. If necessary, equation (16) may be used repeatedly. Also, instead of equation (16), a predetermined value may added to each value $dW_{iW}$, $dP_{iP}$, $dR_{iR}$. Further, the added predetermind value may be variable.

$$dW'_{iW} = dW_{iW} \times A_w$$

$$dP'_{iP} = dP_{iP} \times Ap$$

$$dR'_{iR} = dR_{iR} \times A_R \tag{16}$$

Depending on the limitation of the operation range of the robot, even when the defined value of the posture angle is increased, the posture angle of the reachable preliminary position may not be increased. In this case, as shown in equation (17), an intermediate value is calculated in relation to each parameter for generating the posture angle of the preliminary position, and is added as a generation parameter, whereby the number of generated preliminary positions may be increased and the calibration effect may be improved.

$$dW_{nW+m} = (dW_{m+dWm+1})/2$$

$$dP_{nP+m} = (dP_{m+dPm+1})/2$$

$$dR_{nR+m} = (dR_m + dR_{m+1})/2 \tag{17}$$

The equations for automatically generating the robot positions as described above merely one example. Therefore, in automatically generating the preliminary position which satisfies the condition in which the target is always positioned on the same view line of the camera at the different measurement positions, the generation of the preliminary position and the calibration may be carried out, merely by changing the generating parameter of the corresponding preliminary position, a generating equation and an identifying equation of the calibration. The generating equation may be constituted by arbitrarily combining parameters as shown in equation (8), and also, may be constituted by directly designating the posture of the robot during measurement, by combining only specified parameters, or by combining different generating equations. In the process for automatically generating the preliminary position, the judgment may be carried out every when one preliminary position is generated, and the position correction may be carried out as required. Further, in order to carry out the measurement using less preliminary positions, the exploratory method, as described in Transaction of the Japan Society of Mechanical Engineers ("C" edition), vol. 69, No. 682 (2003-6), pp. 1691-1698, may be used after the preliminary position is generated.

In the above embodiment, the light receiving device is a CCD camera for capturing a two-dimensional image. However, another device having the equivalent function, such as a CMOS camera, may also be used.

The target 6 may be replaced with a point light source such as a light emitting device. In this case, a two dimensional position sensitive detector (PSD), capable of calculating a position of a center of gravity of a distribution of received light, may be used as the light receiving device. When the PSD is used, however, the image processing unit 2 is replaced with another suitable device. For example, when the PSD is used, a processing unit, capable of calculating the position of the center of gravity of the distribution of received light by processing a signal outputted from the PSD, may be used.

Figure 12:
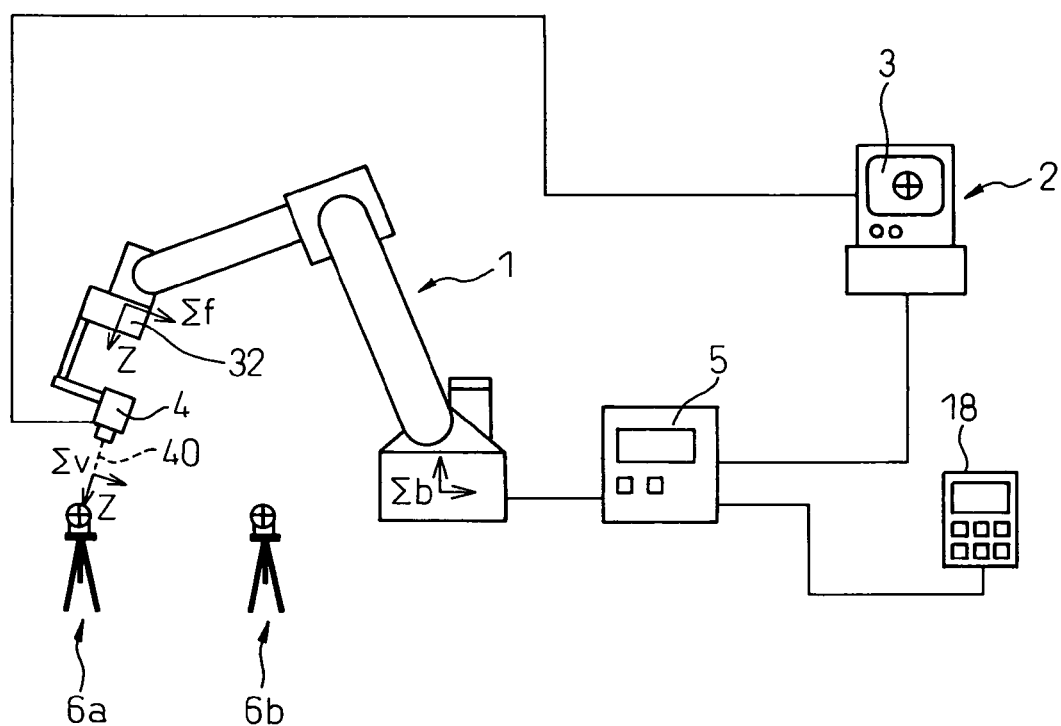
FIG. 12 is a diagram showing a schematic configuration of still another embodiment according to the present invention.

Since the above procedure for calibration is one example of the invention, the procedure may be arranged depending on the configuration of the measurement system. For example, in effect, it may be difficult to uniformly formulate the error of the robot. In other words, it may be difficult to effectively formulate the error over all operation range of the robot. Further, due to an obstacle or the like, the preliminary position generated based on one basic position occasionally can be used in a narrow operation range only. Accordingly, a plurality of targets may be arranged corresponding to the operation area of the robot, so as to carry out the measurement several times. For example, a plurality of targets as shown in FIG. 12 may be measured. As shown in FIG. 12, two targets 6a and 6b are arranged in the robot coordinate system. In this case, each target is captured within the field of vision of the camera by the operator in step T1 of FIG. 7, and the procedure from steps T2 to T5 is repeated twice. Then, steps T6 and T7 are executed. In addition, a plurality of cameras may be arranged in relation to one target, so as to improve the accuracy of measurement.

Also, it is not necessary to use the basic position obtained after step T2 is executed. In other words, the basic position may be independently taught before step T2 is executed.

In a system using a pin as shown in FIG. 3, the image processing unit 2 is not necessary. Therefore, a merit, that labor and time is few because of automatic measurement, cannot be obtained in this case. However, even when the operator has no experience in calibration, the operator can effectively generate the preliminary position by touch-up, whereby the accuracy of the calibration may be improved. Also, this system may be used as an alternative system when the automatic measurement using the camera or the like cannot satisfy a predetermined condition.

As shown in FIG. 4, when a contact-type measurement device such as a double-ball bar is used instead of the image processing unit 2, the automatic calibration may also be carried out. An algorithm for automatically generating the preliminary position according to the invention has no limitation due to a measurement method, whereby the algorithm may be incorporated into another known calibration method.

Figure 13:
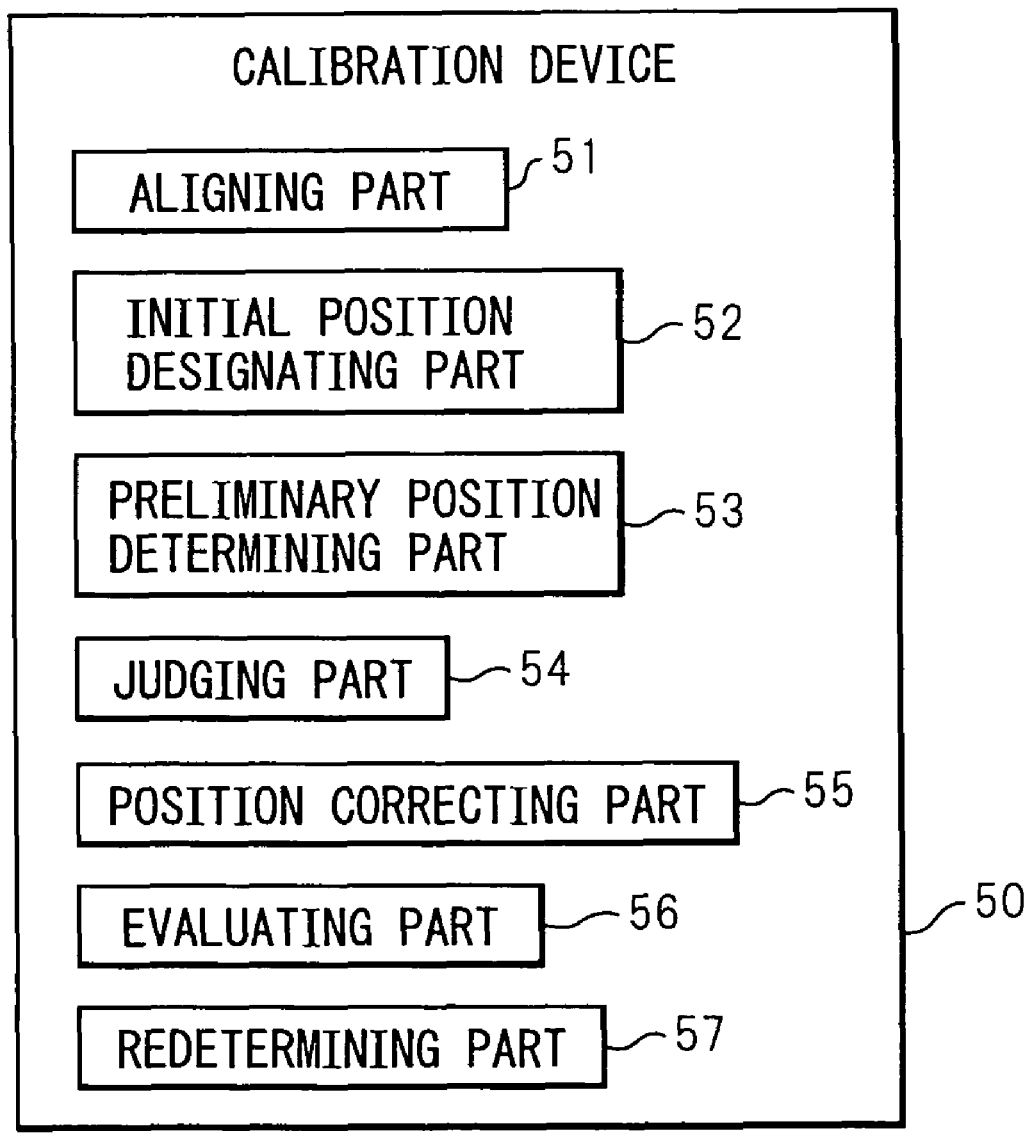
FIG. 13 is a diagram showing a constitution of a calibration device according to the present invention.

FIG. 13 is a diagram showing a constitution of the calibration device according to the present invention. The calibration device 50 includes an aligning part 51, an initial position designating part 52, a preliminary position determining part 53, a judging part 54 and a position correcting part 55. Further, the calibration device may include an evaluating part 56 and a redetermining part. In effect, the function of each part is provided to the robot 1, the image processing unit 2, the camera 4, the robot controller 5 or the combination thereof.

According to the present invention, when the calibration using the robot is carried out, the preliminary position where the robot can reach is automatically generated. Further, the preliminary position may be previously evaluated and automatically corrected based on the evaluation. Therefore, the accuracy of the calibration may be improved.

Further, by combining the calibration device with the non-contact-type light receiving device such as a camera, the calibration with high accuracy may be effectively carried out without depending on the skill of the operator, even when there are many limitations in operation range of the robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A device for calibrating a mechanical parameter of a multi-jointed robot mechanism, comprising:
a measurement device which measures the positional relationship between a first coordinate system fixed to a part of a robot and a second coordinate system fixed outside of the robot;
an aligning part which adjusts a position and a posture angle of the robot so that the positional relationship between the first and second coordinate systems satisfies a condition which is predetermined due to the measurement device, wherein the calibration includes previously generating a plurality of robot positions as preliminary positions where the calibration is carried out, adjusting the position and the posture angle of the robot, by the aligning part, by using each of the generated preliminary position as a start position, so as to obtain a new robot position, and calculating the mechanical parameter based on the new robot position;
an initial position storing part which stores a position of the robot as an initial position, where the positional relationship between the first and second coordinate systems can be measured by the measurement device, in order to generate the preliminary positions;
a preliminary position generating part which automatically generates the plurality of preliminary positions based on a basic position and a parameter relating to the generation of the preliminary positions, the basic position being determined as a robot position which is obtained by adjusting the position and the posture angle of the robot, by the aligning part, by using the initial position stored in the initial position storing part;
a judging part which judges, before the position and the posture angle of the robot are adjusted, whether each of the preliminary positions generated by the preliminary position generating part is included in an operation range of the robot; and
a position correcting part which corrects the parameter relating to the generation of the preliminary positions, so that the preliminary position, which is judged not to be included in the operation range of the robot, is included in the operation range of the robot.

2. The device according to claim 1, further comprising:
an evaluating part which calculates and evaluates an evaluation index, before the position and the posture angle of the robot are adjusted, the evaluation index being used to judge whether an accuracy of the calibration using the preliminary position satisfies a predetermined criterion, in relation to all of the preliminary positions including the corrected position by the position correcting part; and
a regenerating part which regenerates a new preliminary position by which the evaluation index is improved, when the evaluating part judges that the accuracy of the calibration does not satisfy the predetermined criterion.

3. The device according to claim 1, further comprising:
a camera mounted near the front end of the robot;
an image inputting part which inputs an image captured by the camera; and
a detecting part which detects a mark having a geometrical feature arranged on a target on the second coordinate system included in the image inputted by the image inputting part, the position of the target imaged on a light receiving surface of the camera and information of the length relating to the distance between the camera and the target being specified by the geometrical feature,
wherein the adjustment of the position and the posture angle of the robot includes controlling the robot so that the distance between the position of the mark on the light receiving surface of the camera and a predetermined point on the light receiving surface of the camera is equal to or less than a predetermined error, and the difference between the length of the mark on the light receiving surface of the camera and a predetermined value is equal to or less than a predetermined error.

4. The device in according to claim 1, further comprising:
a camera fixed outside of the robot;
an image inputting part which inputs an image captured by the camera; and
a detecting part which detects a mark having a geometrical feature arranged on a target on the first coordinate system included in the image inputted by the image inputting part, the position of the target imaged on a light receiving surface of the camera and information of the length relating to the distance between the camera and the target being specified by the geometrical feature, wherein the adjustment of the position and the posture angle of the robot includes controlling the robot so that the distance between the position of the mark on the light receiving surface of the camera and a predetermined point on the light receiving surface of the camera is equal to or less than a predetermined error, and the difference between the length of the mark on the light receiving surface of the camera and a predetermined value is equal to or less than a predetermined error.

5. A method for calibrating a mechanical parameter of a multi-jointed robot mechanism, comprising the steps of:

measuring the positional relationship between a first coordinate system fixed to a part of a robot and a second coordinate system fixed outside of the robot, by using a measurement device;

adjusting a position and a posture angle of the robot so that the positional relationship between the first and second coordinate systems satisfies a condition which is predetermined due to the measurement device, wherein the calibration includes previously generating a plurality of robot positions as preliminary positions where the calibration is carried out, adjusting the position and the posture angle of the robot by using each of the generated preliminary position as a start position, so as to obtain a new robot position, and calculating the mechanical parameter based on the new robot position;

storing a position of the robot as an initial position, where the positional relationship between the first and second coordinate systems can be measured by the measurement device, in order to generate the preliminary positions;

automatically generating the plurality of preliminary positions, based on a basic position and a parameter relating to the generation of the preliminary positions, the basic position being determined as a robot position which is obtained by adjusting the position and the posture angle of the robot by using the stored initial position;

judging, before the position and the posture angle of the robot are adjusted, whether each of the generated preliminary positions is included in an operation range of the robot; and correcting the parameter relating to the generation of the preliminary positions, so that the preliminary position, which is judged not to be included in the operation range of the robot, is included in the operation range of the robot.

6. The method according to claim 5, further comprising the steps of:

calculating and evaluating an evaluation index, before the position and the posture angle of the robot are adjusted, the evaluation index being used to judge whether an accuracy of the calibration using the preliminary position satisfies a predetermined criterion, in relation to all of the preliminary positions including the corrected position; and regenerating a new preliminary position by which the evaluation index is improved, when it is judged that the accuracy of the calibration does not satisfy the predetermined criterion.

* * * * *